March 14, 1961 P. N. LEHR 2,975,226
BATTERY HOLDER

Filed March 7, 1958 2 Sheets-Sheet 1

INVENTOR.
PHILIP N. LEHR
BY
his ATTORNEYS.

March 14, 1961 P. N. LEHR 2,975,226
BATTERY HOLDER
Filed March 7, 1958 2 Sheets-Sheet 2

INVENTOR.
PHILIP N. LEHR
BY
his ATTORNEYS.

United States Patent Office 2,975,226
Patented Mar. 14, 1961

2,975,226
BATTERY HOLDER
Philip N. Lehr, Huntington, N.Y., assignor to Dictograph Products Inc., a corporation of Delaware
Filed Mar. 7, 1958, Ser. No. 719,960
7 Claims. (Cl. 136—173)

The present invention relates to battery holding devices and, more particularly, to novel and improved battery holding devices incorporating switching means depending upon the position of the battery holder for use with hearing aid assemblies and the like.

In accordance with the invention, a battery holder drawer or bracket forming a part of the outer casing of a pocket-size electrical assembly including an amplifier, a pick-up device and a power supply for a hearing aid, for example, may be pivotally mounted on the casing and adapted to assume one of a plurality of different positions. In one position, the drawer is swung out from the main body of the casing so as to facilitate the insertion or removal of the battery. In a second position, the drawer is pivoted until partially closed with its outline conforming somewhat generally to that of the casing upon which it is mounted. Means may be provided when the battery drawer is in the second position, in which the battery is not directly included in circuit with the other components of the electrical assembly, for maintaining the battery drawer in that position until the user wishes to energize the device. In a third position, the battery drawer is pivoted until fully closed in substantial conformity with the outer casing of the assembly in which it is mounted, and contact is made by the battery with the other components of the electrical circuit of the assembly.

For a more definite understanding of the invention, reference may be had to the following detailed description taken in conjunction with the accompanying figures of the drawing, in which.

Figure 2:
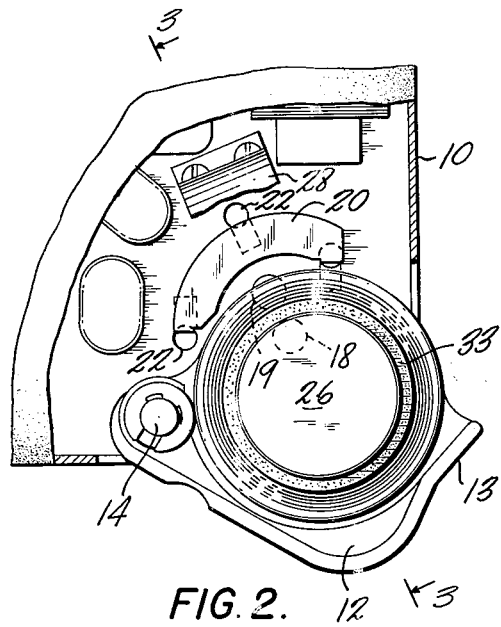
Fig. 2 illustrates the battery holder and battery pivotally positioned in an "off" position with the battery being maintained generally within the outline of the assembly casing but not in electrical circuit with the other components on the assembly.
Figure 3:
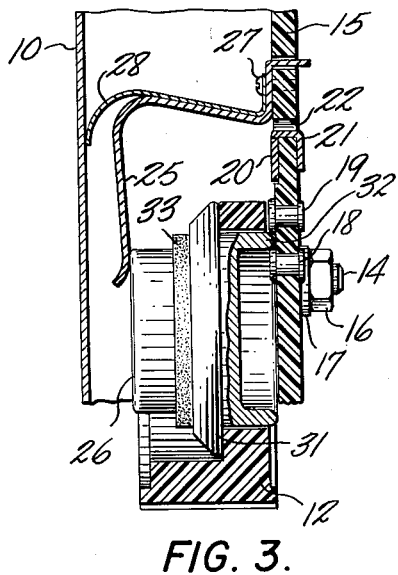
Figure 4:
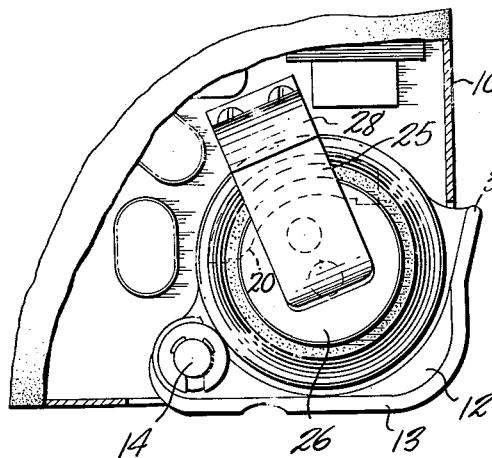

Fig. 3 is a cross-sectional view taken along the line 3—3 and looking in the direction of the arrows in Fig. 2 and illustrates the manner in which the battery is maintained and in the "off" position, in accordance with the invention; and Fig. 4 is a view illustrating the battery in the "on" position in which the battery is held substantially within the general outline of the assembly casing, and is in electrical circuit with the other components of the assembly.

Figure 1:
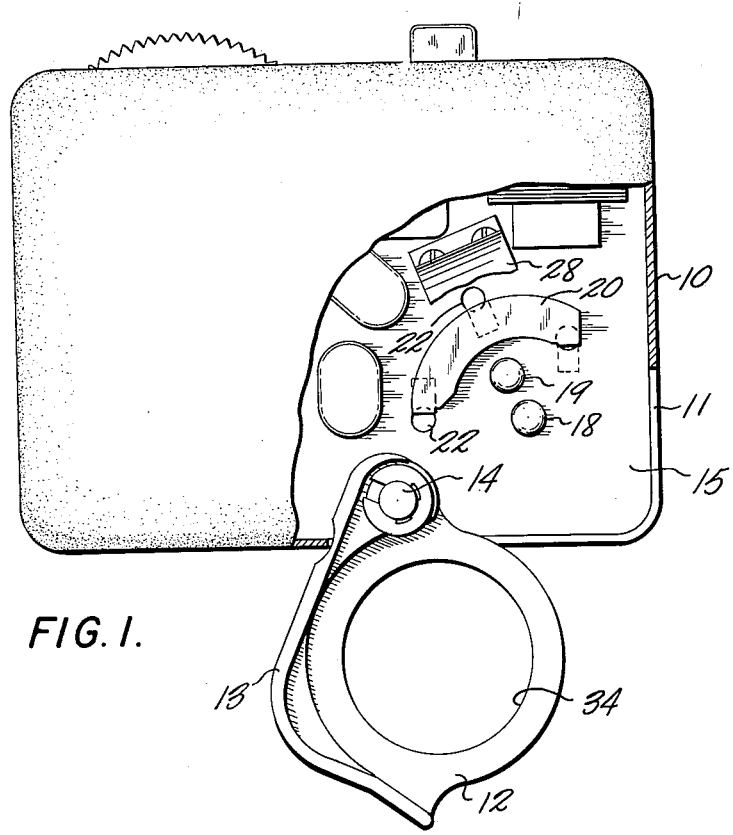
Figure 1 is a side elevation of a hearing aid pick-up amplifier and power supply assembly partially broken away to show the details of the battery holder drawer and associated contacts and stops, in accordance with the invention.

In Fig. 1, a metal casing 10 for the assembly has a slot-like opening 11 in one corner thereof conforming generally to the configuration of a battery holder drawer or bracket 12, the outer edge 13 of which is so constructed as to generally conform to the outline of the casing 10, when the battery holder drawer 12 is in the closed position indicated in Fig. 4.

The battery holder drawer which may be made of a suitable electrically nonconductive material or plastic is mounted on and pivoted about a pivot means 14, which may, for example, be a bolt attached to a chassis 15 also preferably composed of plastic or other nonconductive material. As shown in Fig. 3, the pivot means 14 may be held in place by a nut 16 and a washer 17. Spaced-apart locking studs 18 and 19, which may take the form of conventional rivets with the heads being located on the surface of the chassis 15 over which the battery holder drawer 12 passes, are mounted in the chassis 15. An arcuate contact segment 20 is also mounted in a suitable manner on the face of the nonconducting chassis 15 over which the battery holder drawer passes. The contact segment 20 may be attached to the chassis 15 by means of a plurality of extensions 21 passing through respective holes 22 in the nonconducting chassis 15, the extensions 21 being folded back on the reverse side of the chassis 15, as shown in Fig. 3, to secure the contact segment 20.

A spring contact arm 25 adapted to engage the top surface of a battery 26 held by the battery holder drawer 12 is suitably attached to the chassis 15 by a screw 27. An auxiliary spring contact 28 (Fig. 3) adapted to engage the metal casing 10 of the hearing aid assembly is also mounted upon the chassis 15 by means of a screw 27 and is maintained in direct electrical contact with the contact spring 25.

Figure 1A:
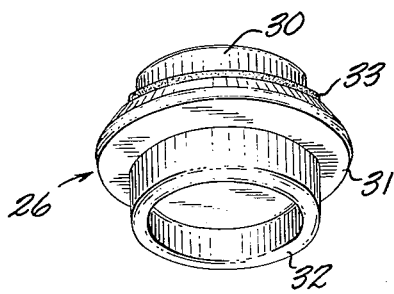
Fig. 1A is a perspective view of a typical battery intended for use in the assembly of Fig. 1.

The battery 26, shown in detail in Fig. 1A, may be a standard type mercury battery having a metallic top surface serving as a positive pole of the battery, a laterally extending supporting flange 31, and a metallic annularly depending or cup-shaped flange 32 on the opposite side thereof serving as the negative pole of the battery. The positive and negative poles 30 and 31 of the battery 26 are spaced apart and maintained in insulated relation by means of a collar 33 of insulating material.

The battery holder drawer 12 has a circular aperture 34 (Fig. 1) adapted to receive the annularly depending flange 31 of the battery 26.

The battery holder drawer 12 is intended to be selectively positioned in one of three positions. When a battery is intended to be removed or inserted, the battery holder drawer 12 is swung out in a position shown in Fig. 1 and the annularly depending flange 32 of the battery 26 is inserted in the aperture 34. The battery holder 12 is then pivoted to the position shown in Figs. 2 and 3, in which the spring contact 25 engages and presses upon the top surface 30, i.e., the positive pole of the battery 26, establishing electrical contact therewith and serving to hold the battery 26 in position in the battery holder drawer 12. With the battery holder drawer 12 in the position shown in Figs. 2 and 3, the end of the annularly depending flange 32 has passed over the head of the stud 18 and rests between the stud 18 and the stud 19. The spring 25 presses the annularly protruding flange 31 into the space between the studs 18 and 19, maintaining the battery in a disconnected or "off" condition.

When it is desired to energize the electrical circuit within the casing 10, inward pressure on the edge 13 of the battery holder drawer 12 causes the end of the annularly depending flange 32 to ride over the head of the stud 19 and come into electrical contact with the arcuate contact segment 20. Suitable connection (not shown) is made from the arcuate contact segment 20 to an appropriate electrical element of the assembly mounted on a chassis 15 within the casing 10.

When it is desired to deenergize the assembly or place it in the "off" condition, a protruding lip 35 of the side 13 of the battery holder 12 may be pushed downwardly (Fig. 4) until the battery holder 12 assumes a position shown in Fig. 2.

Thus there has been provided a novel and improved battery holder for pivotally mounting a battery in different positions within the casing for an electrical assembly such as a hearing aid, in which the position of the unit including the battery holder drawer and battery determine the "on" and "off" conditions of the electrical assembly within the casing.

It will be evident to those skilled in the art, that the above described embodiment is meant to be merely exemplary, and that it is susceptible of modification and variation without departing from the spirit and scope of the invention. For example, while the casing and electrical assembly illustrated is intended to represent a hearing aid assembly having a particular configuration, the principles of the invention will be equally applicable to other types of electrical assemblies and the configuration of the battery holder drawer and location of the locking studs and arcuate contact segments may be readily designed to accommodate different types of batteries and casing arrangements. Further, instead of the annular depending flange of the battery engaging the locking studs, it may be desirable in some circumstances to have a suitable protrusion from the battery holder drawer engage the locking studs.

Therefore, the invention is not deemed to be limited except as defined by the appended claims.

I claim:

1. A battery holder device for an electrical assembly mounted within a casing, comprising a battery holder drawer for receiving a battery adapted to be selectively placed in electrical circuit relation with the electrical assembly and form a battery unit therewith, means for pivotally mounting said battery holder drawer about a fixed point within said casing to enable the battery holder drawer to assume at least three different selective positions relative to the casing, two of said positions being substantially within said casing, a third one of said positions being at least partially outside of said casing to facilitate replacement of said battery, selectively engageable locking means for maintaining said battery unit in a fixed one of said different selective positions within said casing wherein said battery is out of electrical circuit relation with the electrical assembly, an electrical contact segment mounted within said casing and selectively engaged by said battery when said battery unit is in another of said different positions within said casing to place the battery in electrical circuit relation with the electrical assembly, and second selectively engageable means for maintaining said battery unit in said another of said different positions.

2. In an electrical assembly including a plurality of circuit components and having a casing, the combination of a nonconductive chassis positioned in the casing, a battery unit adapted to be selectively placed in electrical circuit relation with other components of said electrical assembly and pivotally mounted on said chassis to facilitate selective placement of said battery unit in one of at least three different positions relative to said casing, a first one of said positions being at least partially outside of said casing, said battery unit having a depending portion adapted to pass over the surface of said nonconductive chassis, locking means mounted on said chassis for engaging said depending portion of said battery unit to maintain said battery unit in a second one of said positions substantially within said casing but not in electrical circuit relation with other components of said electrical assembly, electrical contact means mounted on said chassis and adapted to be engaged by said battery unit when in a third one of said positions other than in the position in which said depending portion thereof engages said locking means for placing said battery unit in electrical circuit relation with other components of said electrical assembly, and means for maintaining said battery unit in engagement with said electrical contact means when said battery unit is positioned to engage said contact means and for maintaining said depending portion of said battery unit in engagement with said locking means when said depending portion of said battery unit is positioned to engage said locking means.

3. In an electrical assembly including a plurality of circuit components and having a casing, the combination of a nonconductive chassis positioned in the casing, said casing having an opening in a side wall thereof, a battery unit adapted to be selectively placed in electrical circuit relation with other components of said electrical assembly and pivotally mounted on said chassis to facilitate selective placement of said battery unit in one of at least three different positions relative to said casing, a first one of said positions being partially outside of said casing through said opening, said battery unit having a depending portion adapted to pass over the surface of said nonconductive chassis, locking means mounted on said chassis for engaging said depending portion of said battery unit in a second one of said positions to maintain said battery unit substantially within said casing but not in electrical circuit relation with other components of said electrical assembly, electrical contact means mounted on said chassis and adapted to be engaged by said battery unit when in a third one of said positions other than in the position in which said depending portion thereof engages said locking means for placing said battery unit in electrical circuit relation with other components of said electrical assembly, and means for maintaining said battery unit in engagement with said electrical contact means when said battery unit is positioned to engage said contact means for maintaining said depending portion of said battery unit in engagement with said locking means when said depending portion of said battery unit is positioned to engage said locking means.

4. In an electrical assembly including a plurality of circuit components and having a casing, the combination of a nonconductive chassis positioned in the casing, said casing having an opening in a sidewall thereof, a battery unit adapted to be selectively placed in electrical circuit relation with other components of said electrical assembly and pivotally mounted on said chassis to facilitate selective placement of said battery unit in one of at least three different positions relative to said casing, a first one of said positions being partially outside of said casing through said opening, said battery unit having a depending portion constituting one of the electrical poles of the battery unit adapted to pass over the surface of said nonconductive chassis, locking means mounted on said chassis for engaging said depending portion of said battery unit to maintain said battery unit in a second one of said positions substantially within said casing but not in electrical circuit relation with other components of said electrical assembly, electrical contact means mounted on said chassis and adapted to be engaged by said battery unit when in a third one of said positions other than in the position in which said depending portion thereof engages said locking means for placing said one electrical pole of said battery unit in electrical contact with other components of said electrical assembly, and spring contact means in electrical circuit relation with other components of said assembly for contacting an opposite electrical pole of said battery unit and for maintaining said battery unit in engagement with said electrical contact means when said battery unit is positioned to engage said contact means and for maintaining said depending portion of said battery unit in engagement with said locking means when said depending portion of said battery unit is positioned to engage said locking means.

5. A battery holder device for an electrical assembly mounted within a casing, comprising a battery holder drawer adapted to receive a battery having a depending flange constituting one electrical pole thereof, means for pivotally mounting said battery holder drawer about a fixed point within said casing to enable the battery holder drawer to assume at least three different selective positions relative to the casing, two of said positions being substantially within said casing, a third one of said positions being at least partially outside of said casing to facilitate replacement of said battery, locking stud means for engaging said depending portion of said battery to maintain said battery holder drawer and said battery in a fixed one of said different selective positions within said casing, an electrical contact segment mounted within said casing and selectively engaged by said depending portion of said battery when in another of said different positions within said casing, and means mounted within said casing and engaging said battery in at least said one and said another of said different positions for selectively holding the battery in one of the two positions and maintaining the battery within the battery holder drawer.

6. A battery holder device for an electrical assembly mounted within a casing, comprising a battery holder drawer adapted to receive a battery having a depending portion constituting one electrical pole thereof and another portion constituting the opposite electrical pole thereof, means for pivotally mounting said battery holder drawer about a fixed point within said casing to enable the battery holder drawer to assume at least three different selective positions relative to the casing, two of said positions being substantially within said casing, a third one of said positions being at least partially outside of said casing to facilitate replacement of said battery, locking stud means for engaging said depending portion of said battery to maintain said battery holder drawer and said battery in a fixed one of said different selective positions within said casing, an electrical contact segment mounted within said casing and selectively engaged by said depending portion of said battery when in another of said different positions within said casing, and spring contact means mounted within said casing and engaging said another portion of said battery constituting said opposite electrical pole in at least said one and said another of different positions for selectively holding the battery in one of the two positions and maintaining the battery within the battery holder drawer.

7. In a battery holder device as claimed in claim 6, in which said casing is electrically conductive, said spring contact means electrically connecting said opposite pole of said battery to said casing.

References Cited in the file of this patent

UNITED STATES PATENTS

| 2,523,354 | Butler | Sept. 26, 1950 |
| 2,882,348 | Erickson | Apr. 14, 1959 |

FOREIGN PATENTS

| 480,194 | Great Britain | Feb. 18, 1938 |
| 638,518 | Great Britain | June 7, 1950 |